United States Patent [19]

Cipolla

[11] 4,448,405
[45] May 15, 1984

[54] VERSATILE GRIPPING DEVICE

[75] Inventor: Thomas M. Cipolla, Ballston Lake, N.Y.

[73] Assignee: General Electric Company, Schenectady, N.Y.

[21] Appl. No.: 280,605

[22] Filed: Jul. 6, 1981

[51] Int. Cl.³ .............................................. B25B 1/24
[52] U.S. Cl. ...................................... 269/32; 269/280; 269/902; 294/86 R; 294/88; 294/DIG. 2
[58] Field of Search ................... 294/86 R, 88, 103 R, 294/106, DIG. 2; 269/27, 32, 34, 148, 218, 257, 261, 262, 265–271, 279–284, 900, 902; 279/123

[56] References Cited

U.S. PATENT DOCUMENTS

| 1,560,091 | 11/1925 | Nygren | 269/148 |
| 1,994,217 | 3/1935 | Guillaix | 269/279 X |
| 2,341,602 | 2/1944 | Dewey | 269/34 X |
| 2,350,099 | 5/1944 | Dermond | 269/261 |
| 2,798,234 | 7/1957 | Benninghoff et al. | 279/123 X |
| 3,190,666 | 6/1965 | Testa | 279/123 |
| 3,679,221 | 7/1972 | Behrens | 279/123 X |
| 4,291,870 | 9/1981 | Warde | 269/279 |
| 4,363,475 | 12/1982 | McCarty | 269/283 X |

Primary Examiner—Johnny D. Cherry
Attorney, Agent, or Firm—Donald R. Campbell; James C. Davis, Jr.; Paul R. Webb, II

[57] ABSTRACT

Objects of different sizes and shapes are gripped in a monostable manner by an apparatus which has a single pneumatic power source and has interchangeable jaw assemblies attached to an operating mechanism that provides a linear motion to engage the object. The gripping jaws are selected from a set of three basic types of generic jaws, i.e., nose-shaped jaws and vee-shaped jaws for curved surfaces, and rest button jaws for flat surfaces. Various turbine blades, for instance, are grasped by the airfoil and root using different combinations of these jaw types and have a predictable location relative to the gripping device.

6 Claims, 27 Drawing Figures

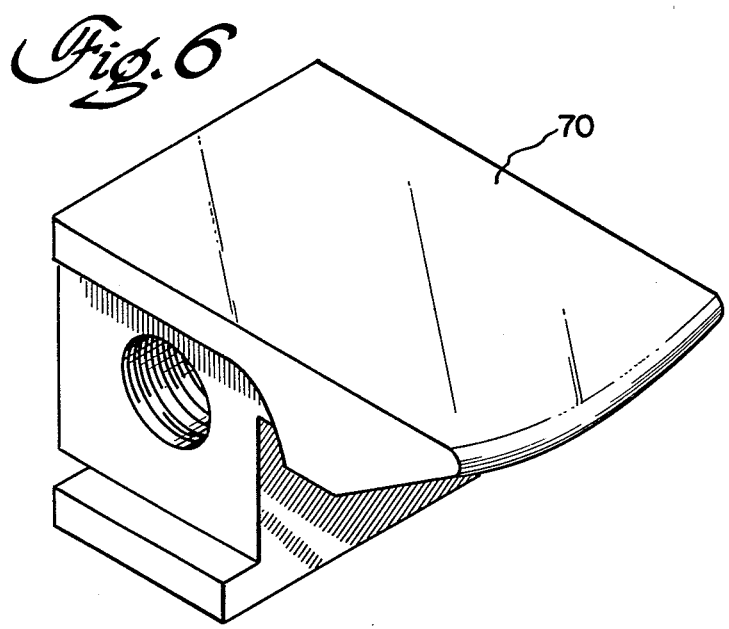
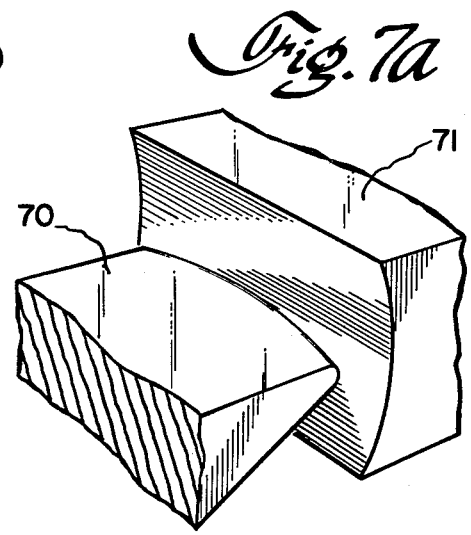
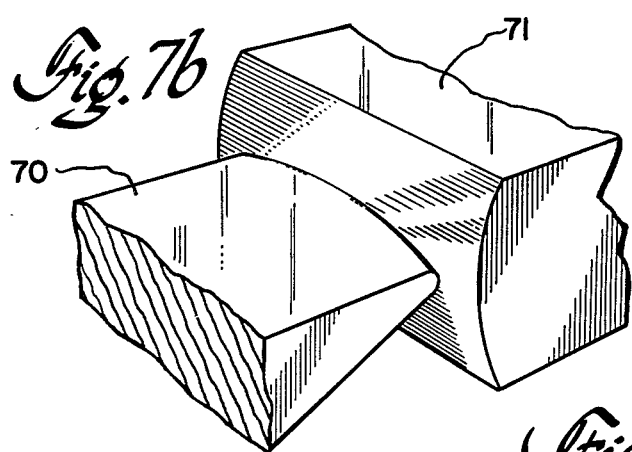
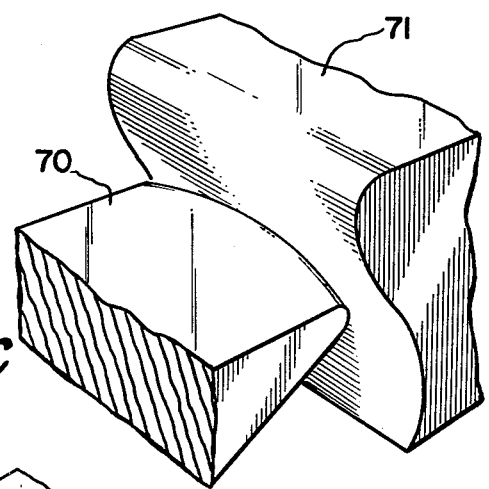
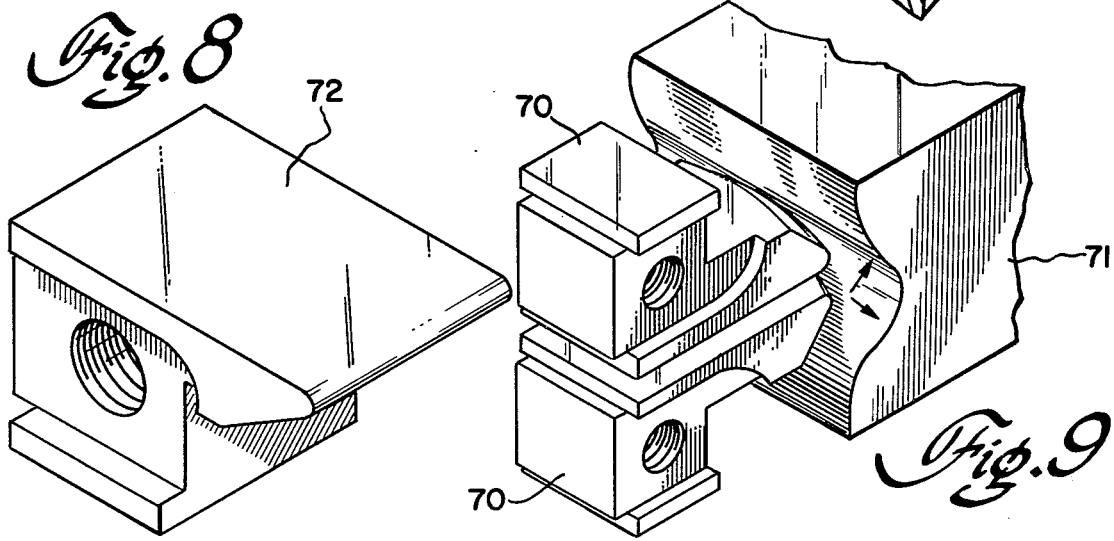

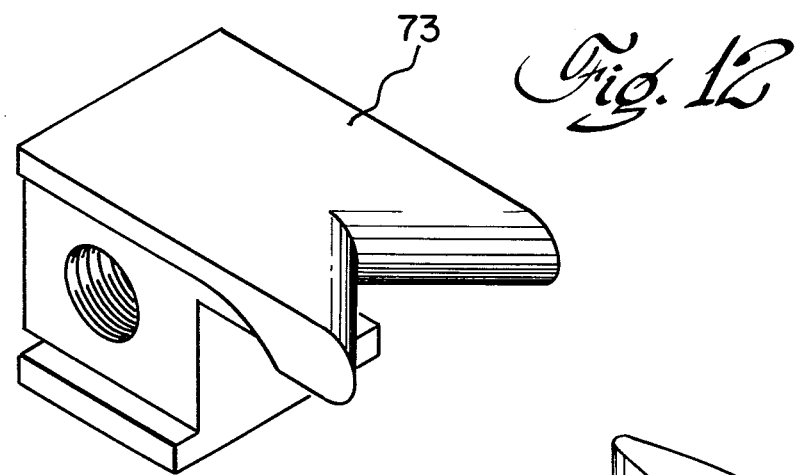
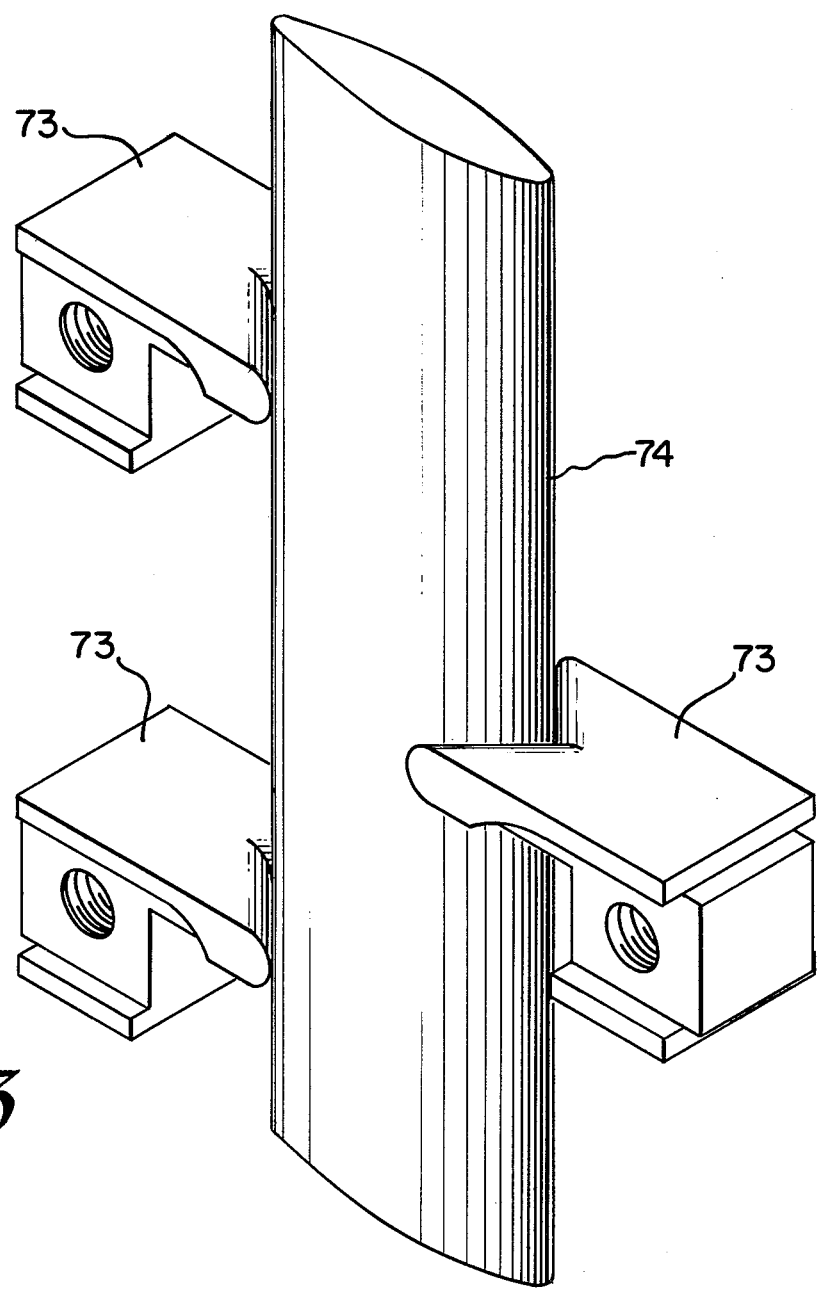

VERSATILE GRIPPING DEVICE

BACKGROUND OF THE INVENTION

The Government has rights to this invention pursuant to Contract No. F33615-78-C-5095 awarded by the United States Air Force.

This invention relates to a gripping device, especially for programmable equipment such as robots, capable of grasping many different object shapes and of easy and fast changeover to the different part shapes. The improved gripper, which is not a magnetic type, can be used for fixturing parts for manufacturing, transporting, assembly, or inspection equipment.

SUMMARY OF THE INVENTION

A principal object and feature of the invention is to provide an apparatus which applies three static opposing forces and three static opposing torques each in three orthogonal directions to solid objects using the single pneumatic power source or its equivalent.

Another object is to provide such an apparatus which has an operating mechanism that has a straight line motion in order that the directions of the forces are not affected by the size of the object to be gripped.

Still another object is to provide such an apparatus which grips objects in a monostable manner, i.e., activating the device on an object will have a single, predictable relative location with respect to the gripping device.

A further object is to provide an apparatus that will grip many different objects that are identical except for small dimensional variations without making any adjustment or change of parts of the apparatus.

A further object is to provide such an apparatus that will grip objects of different sizes and shapes by interchanging parts and adjusting the position of the parts of the device that are size and shape dependent.

A further object is to provide such an apparatus that has interchangeable and position adjustable parts for accommodating objects of different sizes and shapes, and that are of a generic nature rather than dependent on specific objects, and allow the apparatus to grip a wide variety of objects using available gripping parts without the necessity of designing new parts for each object to be gripped.

A further object is to provide an apparatus of the type mentioned above that will allow parts to be interchanged to accommodate objects of different sizes and shapes in a timely manner, in less than one minute.

A versatile gripping device which has all of the foregoing features is comprised of an operating mechanism to which are attached a pair of removable, interchangeable jaw assemblies. The gripping jaws on these assemblies are selected from a set of generic jaws that in different combinations are adapted to grasp a wide variety of objects and parts. Actuation of the pneumatic cylinders of equivalent power source on the operating mechanism causes relative linear motion of the jaw assemblies between an open position and a closed position in which the object is gripped in a monostable manner. The three basic jaw types are nose-shaped jaws primarily for concave and concave/convex surfaces, vee-shaped jaws primarily for convex surfaces, and multiple rest button jaws for flat surfaces. The interchangeability of jaw types allows the jaw assembly to be adaptable to the various shapes of the objects to be gripped.

The operating mechanism according to a specific embodiment has a base plate and a pair of slides, means for mounting the slides to have straight line motion, and the linear power source. The jaw assembly releasably clamped to the slide includes a right-angle jaw mounting base, one or more brackets adjustably mounting the gripping jaw on the mounting base, and means for precisely locating the jaw assembly on the slide. The wide range of adjustability of jaw positions allows the jaw assembly to be adjusted to grip objects of various sizes using existing parts.

To illustrate the invention, the gripping of the airfoil and root of turbine blades of many different sizes and shapes is explained in detail.

BRIEF DESCRIPTION OF THE DRAWINGS

FIG. 6 is a perspective of a nose jaw;

FIGS. 7a, 7b, and 7c are fragmentary perspectives of the nose jaw applying a force to smoothly varying surfaces;

FIG. 8 shows a straight-edge nose jaw;

FIG. 9 illustrates two nose jaws applying diverging forces;

FIG. 12 is a perspective of a vee jaw;

FIG. 13 shows three vee jaws gripping a convex-edge object;

DESCRIPTION OF THE PREFERRED EMBODIMENTS

Figure 1:
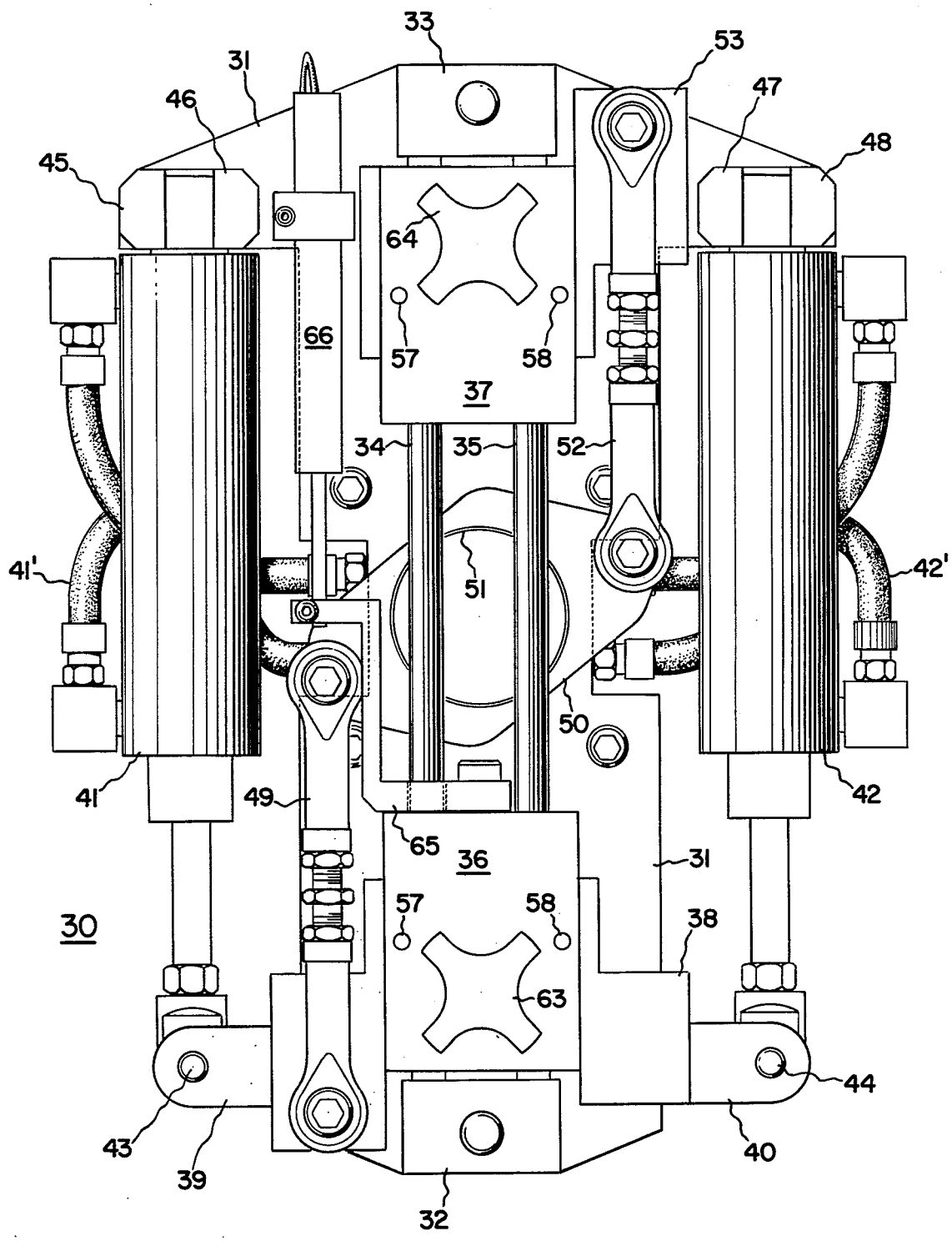
FIGS. 1 and 2 are plan and side views of the operating mechanism in open position.
Figure 2:
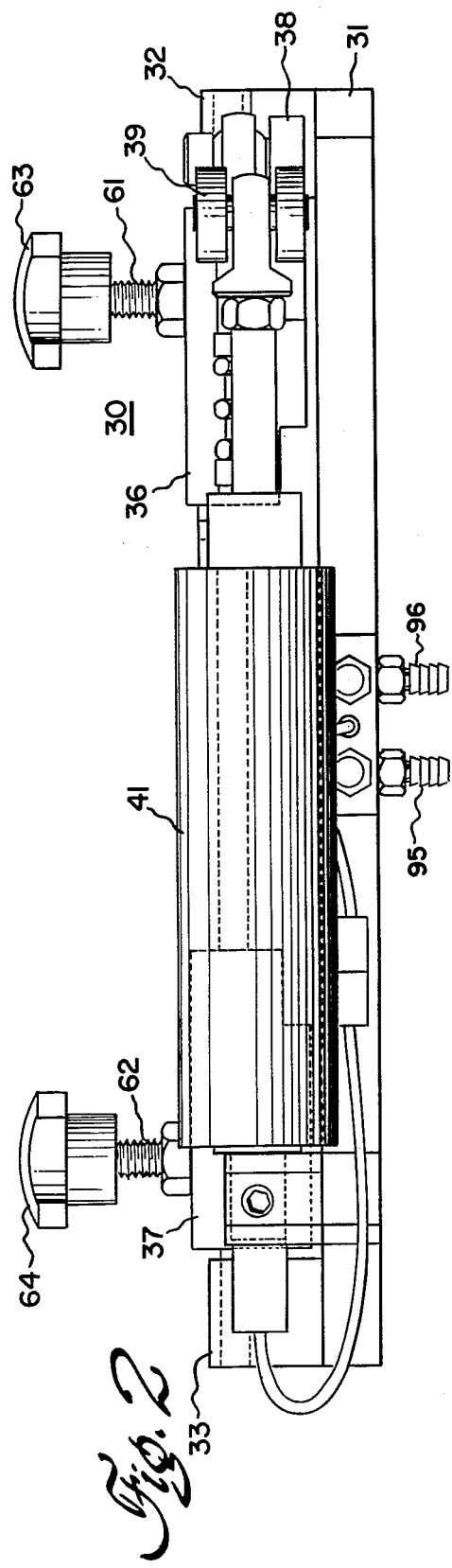

The operating mechanism 30 of the gripping device is shown in FIGS. 1–4 and has a base plate 31 to which are fastened two blocks 32 and 33 which hold two parallel rods 34 and 35. On rods 34 and 35 are mounted two slide blocks 36 and 37 which are fitted with linear ball bearings that allow them to slide axially along the rods. An arm 38 is attached to the lower surface of slide 36 and has two clevises 39 and 40 which are an integral part of the arm. The movable parts of pneumatic cylinders 41 and 42 are attached to the clevices 39 and 40 by means of pins 43 and 44, and the stationary portion of the pneumatic cylinders are mounted to base plate 31 through trunnion blocks 45-48. Pressurized air supplied at hose fittings 95 and 96 flows through a "T" shaped passageway 97 and through the air hoses 41' and 42'. The pressurized air operates pneumatic cylinders 41 and 42 thus causing linear motion of slide 36 along the rods 34 and 35. Alternatively, the power sources may be hydraulic cylinders.

A connecting rod assembly 49 has one end fastened to arm 38 and the other end pivoted to a crank 50 which in turn is pivotally attached to base plate 31 through a bearing 51. A second connecting rod assembly 52 is also pivoted to the crank 50 and is fastened at the other end to an arm 53 which is attached to slide block 37. Thus, slides 36 and 37, connecting rods 49 and 52, and crank 50 form a double crank and slider mechanism which, when the penumatic cylinders are actuated, causes the two slides 36 and 37 to move axially along rods 34 and 35 but in opposite directions. That is, operating pneumatic cylinders 41 and 42 not only causes linear motion of slide 36 but an equal and opposite linear motion of slide 37. This motion of the slide blocks, to which the gripper jaw assemblies 54 and 55 (FIG. 3) are releasably clamped, provides the straight line motion necessary for engaging and disengaging the gripper on the object to be gripped such as the turbine blade 56.

Figure 15:
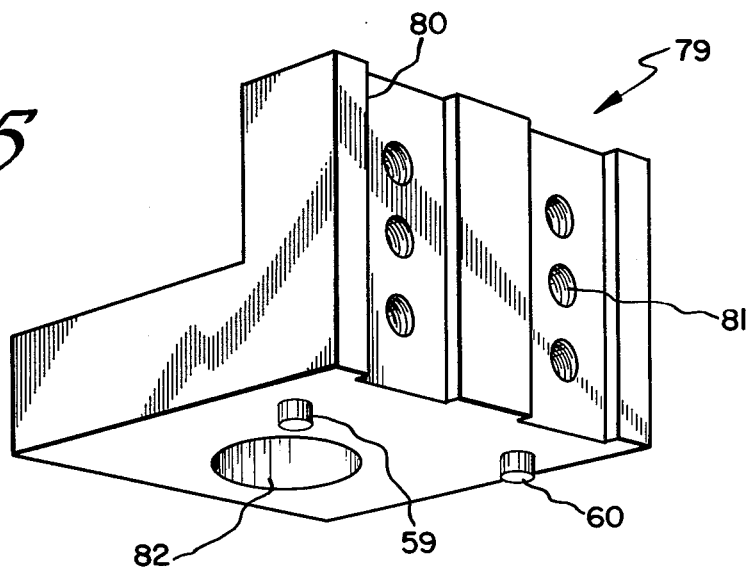
FIG. 15 is a perspective of the jaw assembly mounting base.

To facilitate the attachment of the jaw assemblies 54 and 55 to slides 36 and 37, each of the slides is equipped with two holes 57 and 58 (FIG. 1) which have a precise diameter and location. These holes accept precisely located pins 59 and 60 (FIGS. 4 and 15) on the jaw assembly and allow for a fast but precise location of the jaw assembly. Upstanding threaded studs 61 and 62 on slides 36 and 37 are used with nuts 63 and 64 for releasably clamping the jaw assemblies 54 and 55 to the slides. The exact position of slides 36 and 37 is sensed and analog electrical signals are developed. An arm 65 (FIG. 1) is fastened to the end of slide block 36 and to the movable portion of a linear motion transducer 66. The stationary part of this transducer is secured to base plate 31, and thus the exact position of the gripper device, especially in the closed position, is avialable to the machine, such as automatic inspection equipment for the turbine blades.

Figure 5:
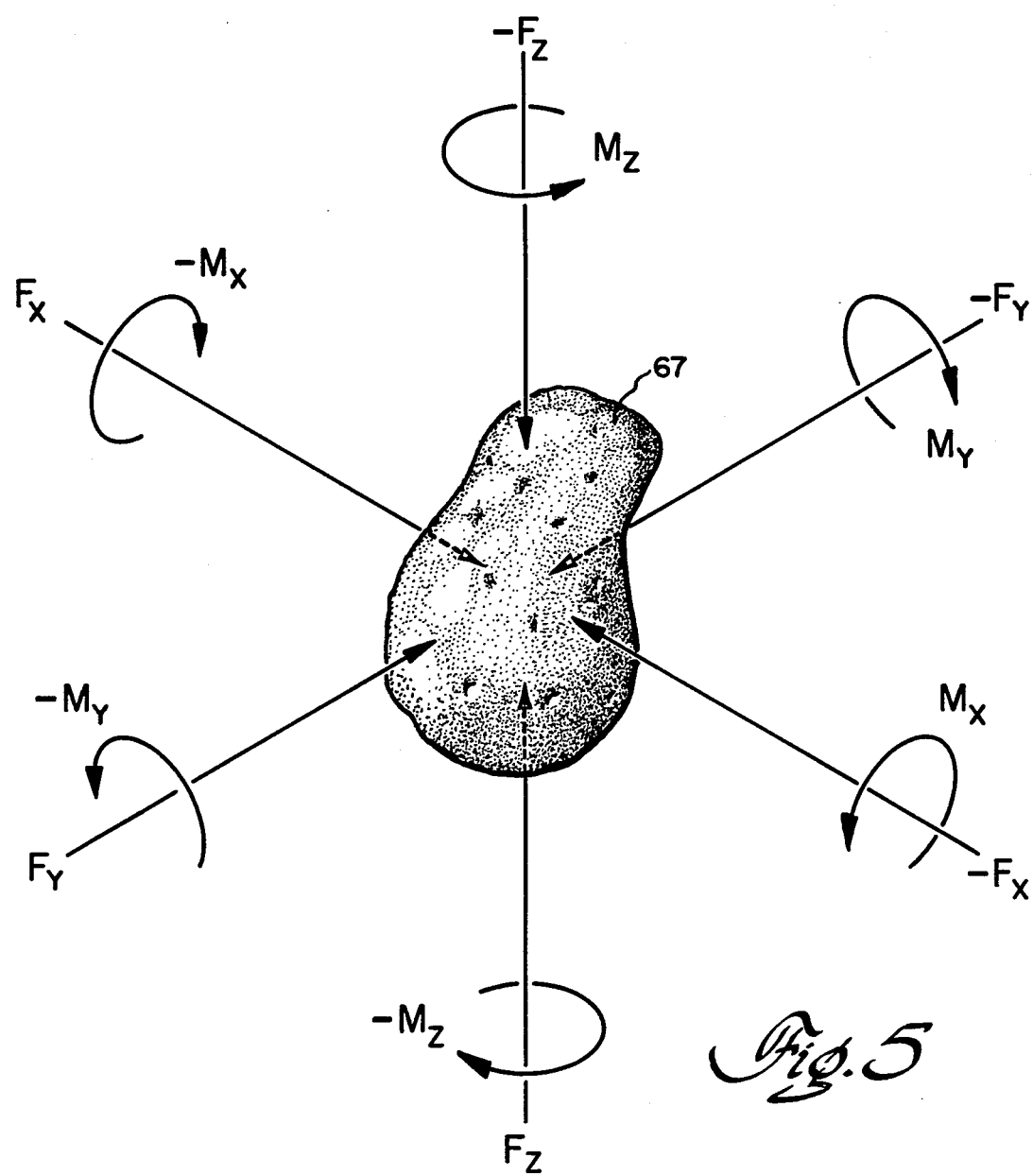
FIG. 5 is a diagram of three opposing pairs of forces and three opposing pairs of torsional moments acting on a solid object.

In order that a solid object 67 be placed in a known and predicable location, i.e., gripped, the resultant forces acting upon it must be three opposing pairs of linear forces, each in an orthogonal direction and three opposing pairs of torsional moments (torques), each acting in three orthogonal directions. This is shown diagrammatically in FIG. 5. The magnitude of these resultant forces and torques must be larger than any force or torque encountered in the work process on the object; for example, inertia forces in transporting, gravitational forces in static holding, or external forces applied to the object in assembly, machining, or inspection. It will be noted some of these forces can be provided by friction.

Because one of the objects of this invention is to grip objects of a generic shape rather than specific objects, consideration was given to generic shapes when designing the jaws which apply forces to the object. One such generic jaw, nose-shaped jaw 70, is shown in FIG. 6. This jaw has a radius of curvature in two directions forming a contact area which has the shape of a section of a toroid. When brought into contact with an object of smoothly varying surface, a single contact point is assured providing the object is not concave and with a radius of curvature at the contact point less than that of the jaw. For the jaw to be completely general and assure a single contact point for a surface of any radius, both radii of the jaw would have to be infinitesimally small. This, however, is not practical because the small contact area would cause a high local stress on the object to be gripped at the point of contact and would not provide the jaw strength necessary for most aplications. By selecting the two radii of curvature, a practical compromise between generality for a particular set of objects to be gripped and stress and strength considerations can be met. Examples of how this nose jaw can be used to apply a single force to a smoothly varying surface on object 71 are shown in FIGS. 7a, 7b, and 7c. A variation of this generic type of jaw is depicted in FIG. 8, where straight-edge nose jaw 72 has a rounded contact area.

To meet the conditions of opposing resultant pairs of forces as stated above, it is in many cases necessary to apply pairs of forces in close proximity to one another. Because the force generated by the jaw is always perpendicular to the object's surface, for concave surfaces the directions of these pairs of forces diverge from one another as shown by the two arrows at the right of FIG. 9. By using two nose jaws 70 back to back in the jaw assembly, such diverging force directions can be achieved.

Figure 3:
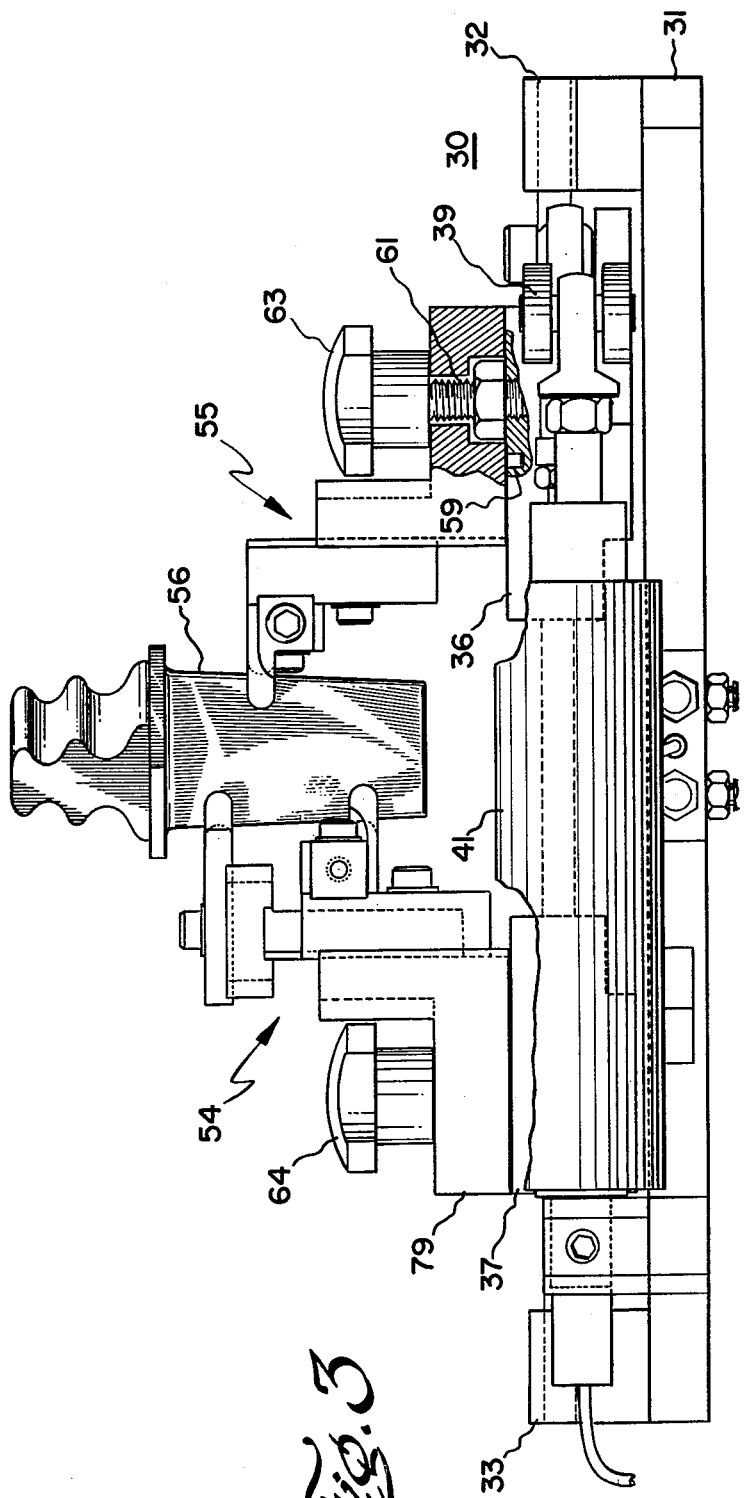
FIG. 3 is a side view and partial cross section of the operating mechanism in closed position and of vee type jaw assemblies gripping a turbine blade.
Figure 4:
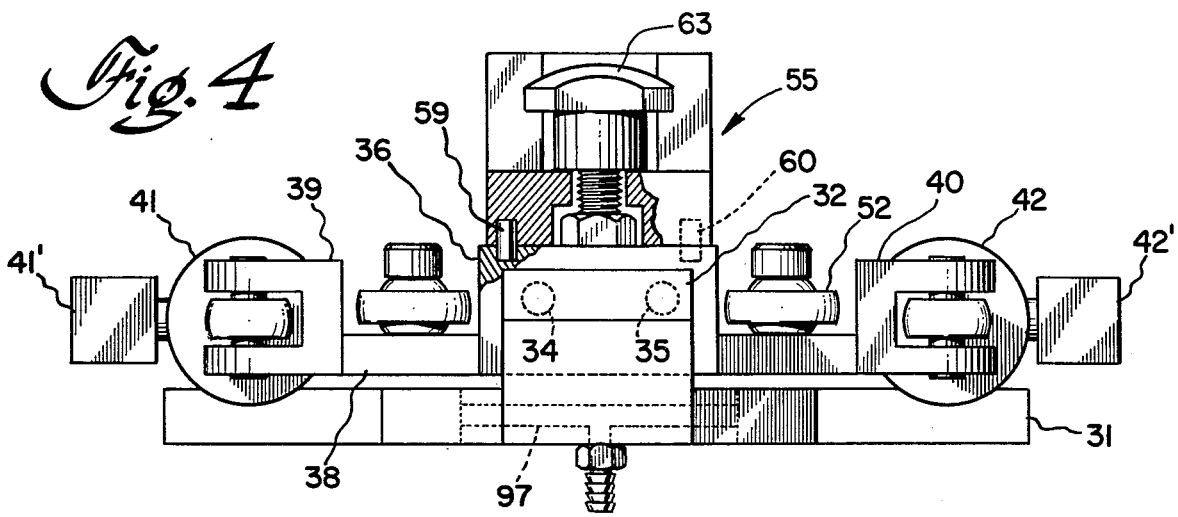
FIG. 4 is an end view and partial cross section of the operating mechanism and jaw assembly.
Figure 10:
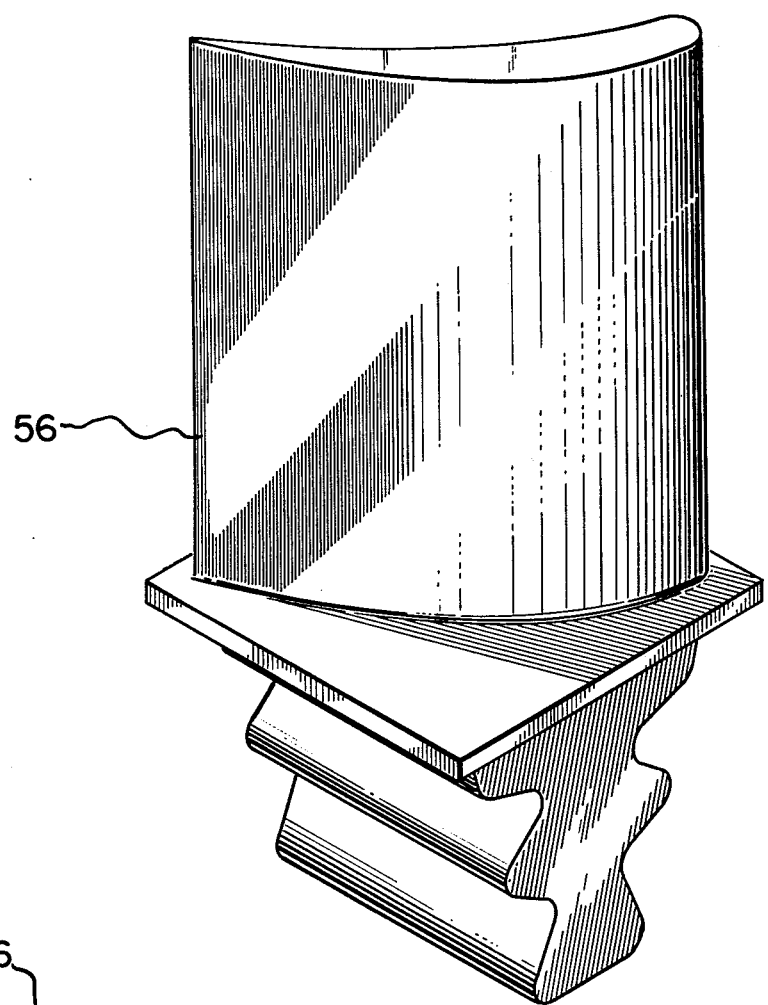
FIG. 10 shows a turbine blade.
Figure 11A:
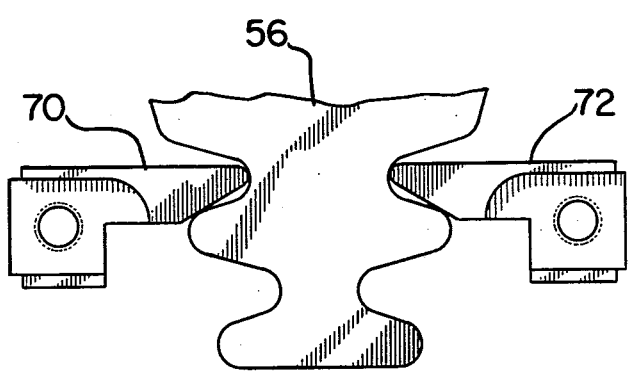
FIGS. 11a and 11b depict two nose jaws gripping different size turbine blades.
Figure 11B:
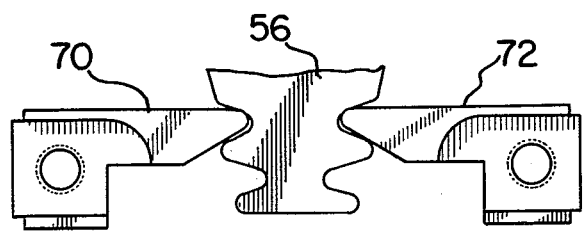

Another type of surface frequently encountered, particularly with turbine blades, is one that smoothly varies from concave to convex as shown in FIG. 10, which is an enlarged view of the blade 56 in FIG. 3. Nose-shaped jaws 70 and 72 can be used to apply pairs of directionally diverging forces to these concave-convex shapes using a single jaw. In FIGS. 11a and 11b the roots of two different sized turbine blades are gripped in a monostable position between a curved edge nose jaw 70 and a straight edge nose jaw 72. Note that the same jaw can be used for a range of radii of curvature and therefore can be used on many different objects within this range. This feature is useful from the standpoint of using a gripper for gripping many different objects, all of which would be considered a particular part type, but have small dimensional differences that cause small shape differences from object to object. However, since the range of acceptable radii of curvature for this jaw is much larger than the tolerances normally encountered on objects of a single part type, a more general feature of this jaw is that the same jaw can also be used on many different part types which have widely varying nominal radii of curvature.

Another common generic shape encountered in gripping parts is a convex surface. To meet the conditions of opposing resultant pairs of forces (FIG. 5), it is in many cases necessary to apply two forces in close proximity to one another for this surface shape also. Although two of the nose-shaped jaws can in many cases accomplish this, it is more convenient to use the vee jaw shown in FIG. 12. The gripping jaw 73 has two contact areas, each shaped as a sector of a cylinder; the axes of the cylinders intersect to form a vee shape. An example of this jaw in use is shown in FIG. 13. This shows two forces being applied from each of the three jaws to an elliptically shaped prism 74. As in the case of the nose-shaped jaw 70, small variations in the shape of the object being gripped, e.g., nonlinearity of the prism, do not affect the location of the forces being applied to the object. Thus monostable gripping forces are assured.

Figure 14:
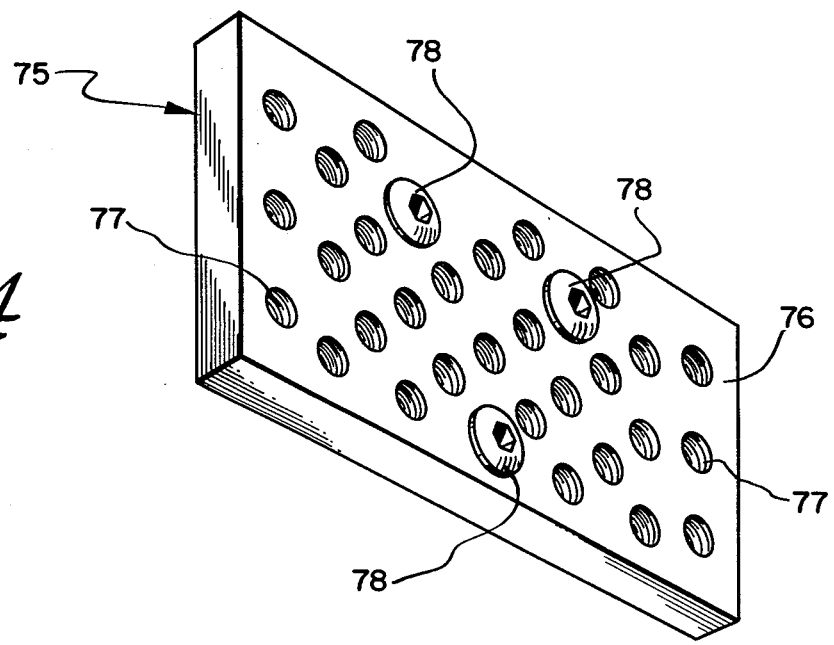
FIG. 14 illustrates a three button flat jaw mounting base.

Another common generic shape encountered in gripping parts is the flat surface. Since an object of this invention is to accommodate small dimensional variatios without making any adjustments to the gripper, this jaw type must be able to monostably grip objects that are not actually flat, but nearly flat. By contacting a nearly flat surface with three spherical rest buttons, a monostable contact with the object to be gripped is assured. A typical rest button jaw 75 for such a purpose is shown in FIG. 14. This jaw is made up of a flat mounting plate 76 with a number of holes 77 for possible location of spherically shaped rest buttons 78. In this case, socket button head screws which have spherical heads are used for the rest buttons and holes 77 are tapped in order to fasten these screws to the mounting plate. A number of holes are provided in the mounting plate to provide spatial adjustment of the rest buttons to accommodate size variations of different objects.

Three basic gripping jaw types have been presented, i.e., the nose-shaped jaw in FIG. 6, primarily for concave or concave/convex surfaces, the vee-shaped jaw in FIG. 12 primarily for convex surfaces, and the multiple rest button jaw in FIG. 14 for flat surfaces. A suitable mounting system for this set of generic jaws is necessary. To accommodate various object sizes, the mounting system must allow for spatial adjustment of the gripping jaws. A basic element of the mounting system is the right-angle jaw mounting base 79 illustrated in FIG. 15. The front face of this base has two key slots 80 with three tapped holes 81 in each slot for mounting jaws and jaw brackets. This base, along with one or more gripping jaws and adjusting brackets mounted on it, comprise a jaw assembly. On the bottom face are the two precisely located pins 59 and 60 which fit into holes on the slides 36 and 37. This allows fast and accurate locating of the jaw assemblies (54 and 55) on the slide blocks. A hole 82 in the bottom face of the base accepts the stud and nut on the slide assembly (elements 61–64) for the purpose of fastening the jaw assemblies on the slides.

Figure 16A:
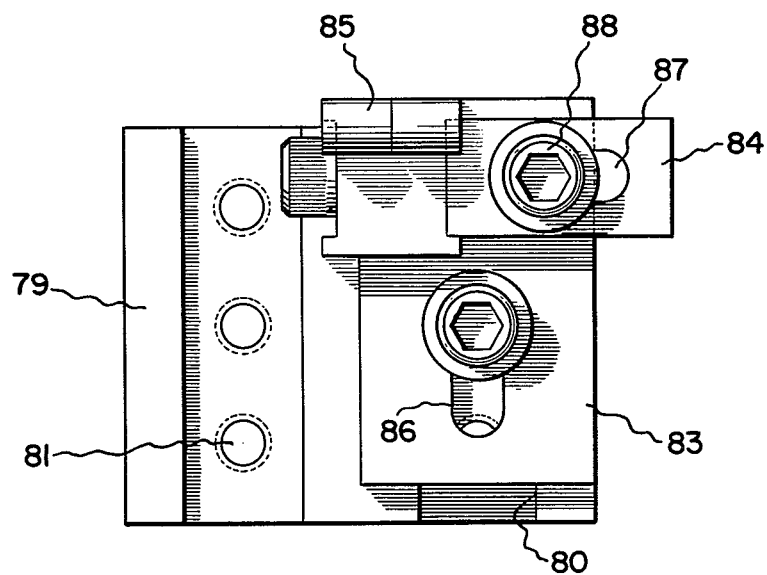
FIGS. 16a and 16b show assembled configurations of four parts to make up vee jaw assemblies.
Figure 16B:
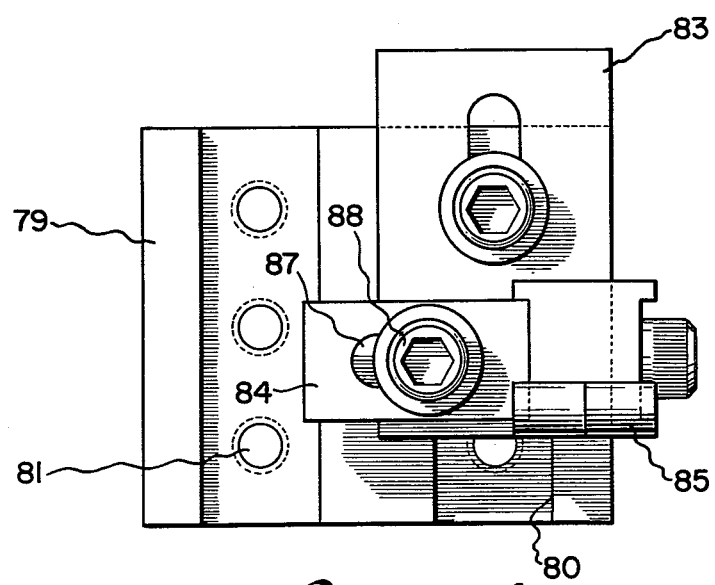

FIGS. 16a and 16b (also refer to FIG. 17) show just two of the several assembled configurations of four parts, each of which makes up a jaw assembly. These four parts are the jaw mounting base 79, vertical adjusting bracket 83, horizontal adjusting bracket 84, and a horizontal vee jaw 85. Bracket 83 has a dovetail-like key on the back surface which slides up and down in key slot 80. Note that bracket 83 can be fastened to base 79 upside down and rightside up and in either of the two key slots 80 on the base 79 as shown. Furthermore, bracket 83 can be attached to the jaw mounting base 79 with any of the three mounting holes 81 in each of the two key slots and can be adjusted to any height within each of the six mounting holes by way of the slotted hole 86 in bracket 83. These combinations of assembly configurations and adjustments within each configuration allows great latitude in adjustment of the jaw in the vertical direction. In like manner, horizontally adjustable bracket 84 can be attached to bracket 83 using any of the three mounting holes and is adjustable within each mounting hole through the use of the slotted hole 87. This gives a wide range of jaw position adjustment in the horizontal direction. Symmetry of vee gripping jaw 85 also permits more possible configurations, to allow for still more flexibility of jaw position. In FIG. 16a, vee jaw 85 may be mounted rightside up and upside down to the left of fastener 88, and rightside up and upside down to the right of the fastener. In any of these four orientations, the jaw is adjustable horizontally. In FIG. 16b the same is true and one of the many possible positions of the vee jaw 85 is illustrated. This wide range of adjustability of jaw position allows the jaw assembly to be adjusted to grip objects of various sizes using existing parts and therefore excludes the necessity of designing new parts for most object types to be gripped.

Figure 17:
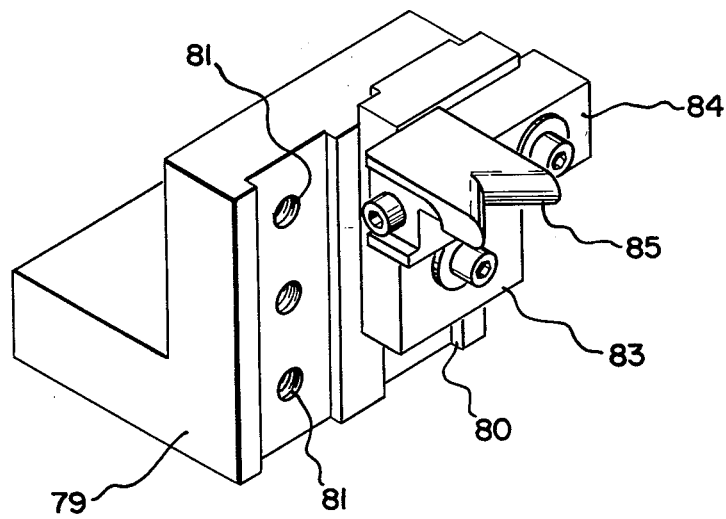
FIGS. 17 and 18 are perspectives of horizontal and vertical vee jaw assembles.
Figure 18:
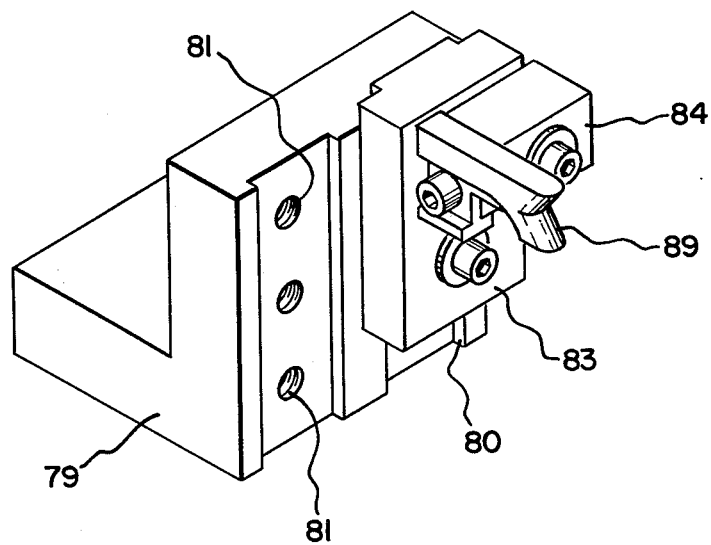

Many jaw types are interchangeable on the jaw assembly. FIG. 17 shows a horizontal vee-shaped jaw 85, as in FIG. 16a; FIG. 18 has a smaller, vertical vee-shaped jaw 89. To illustrate another of the many possible configurations, a nose-shaped jaw 70 or 72 (FIGS. 6 and 8) may be substituted for either jaw.

Figure 19:
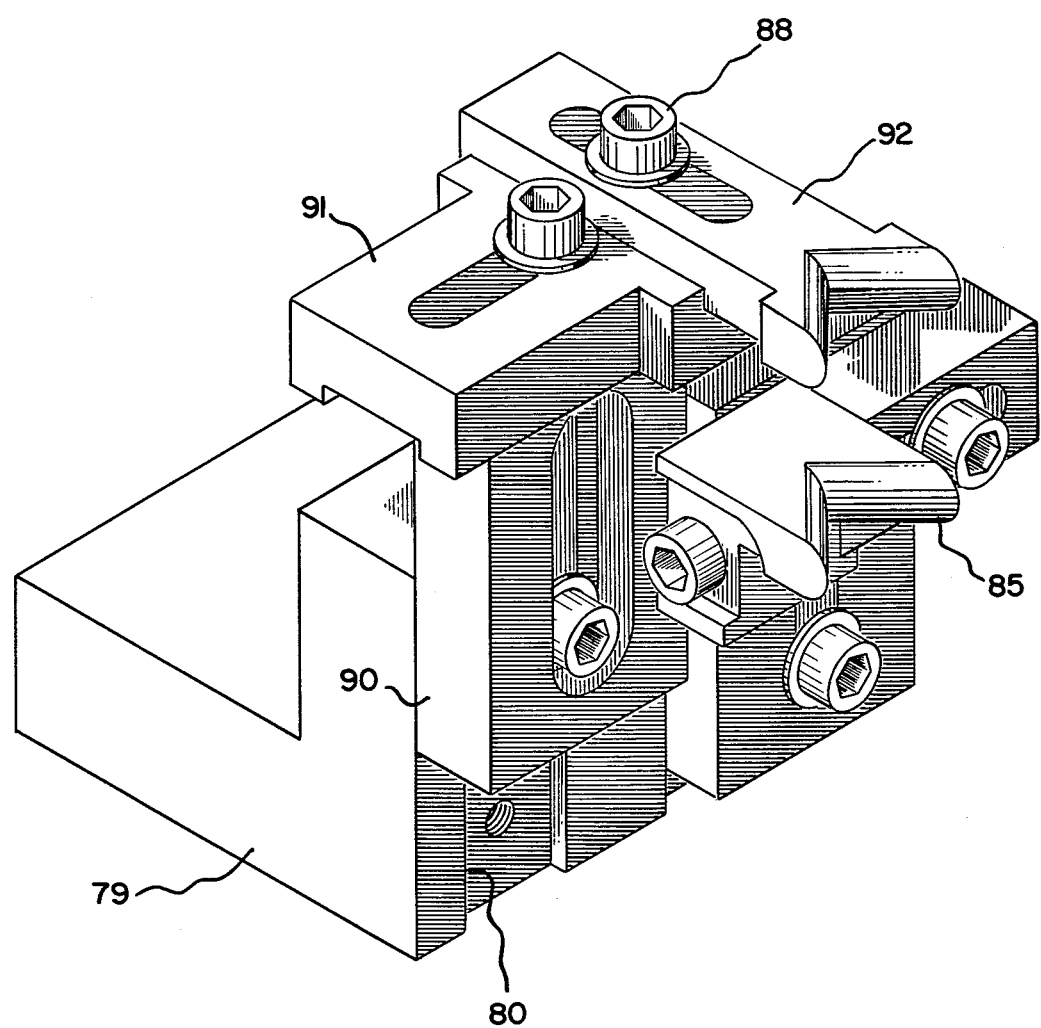
FIG. 19 shows two horizontal vee jaws on one jaw assembly.

In actual practice, it is sometimes necessary to mount more than one gripping jaw on a single jaw assembly. For example, turbine airfoils require two horizontal vee jaws on one jaw assembly and one horizontal vee jaw on the other jaw assembly. This is in fact illustrated in FIG. 3. Furthermore, it is also sometimes necessary to allow a third adjustment direction to one of the jaws. FIG. 19 shows such an example. Bracket 90 is vertically adjustable on mounting base 79 in a manner similar to that described above, and bracket 91 is clamped to the top of bracket 90 and is horizontally adjustable in the same similar manner. Vee-shaped jaw 92 is adjustable perpendicular to the other two adjustment directions. Note that two jaws can be mounted on base 79 at the same time by utilizing both key slots 80 on the mounting base and, because of the symmetrical design of the mounting parts, any jaw can be mounted on either of the two key slots on mounting base 79. In the figure a second jaw 85 is mounted in the same way as in FIG. 17 but in a different vertical position. Elements 88 are all screw fasteners.

Figure 20:
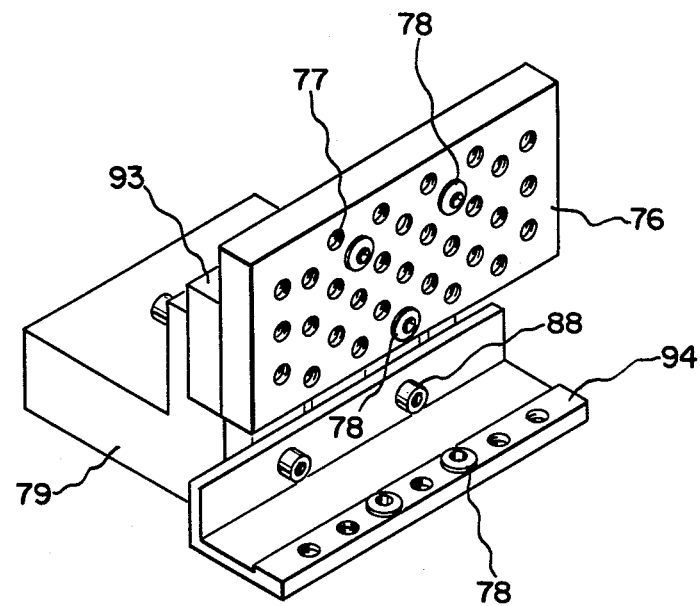
FIG. 20 is a perspective of a typical flat jaw assembly.
Figure 21:
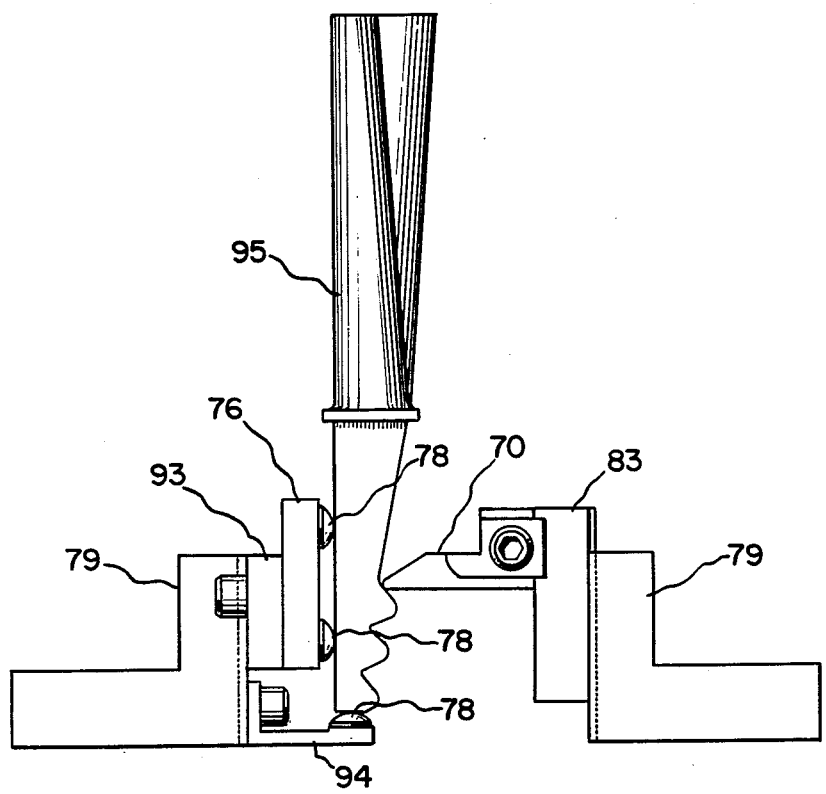
FIG. 21 is a side view of a tubine blade gripped between flat and nose type jaw assemblies.
Figure 22:
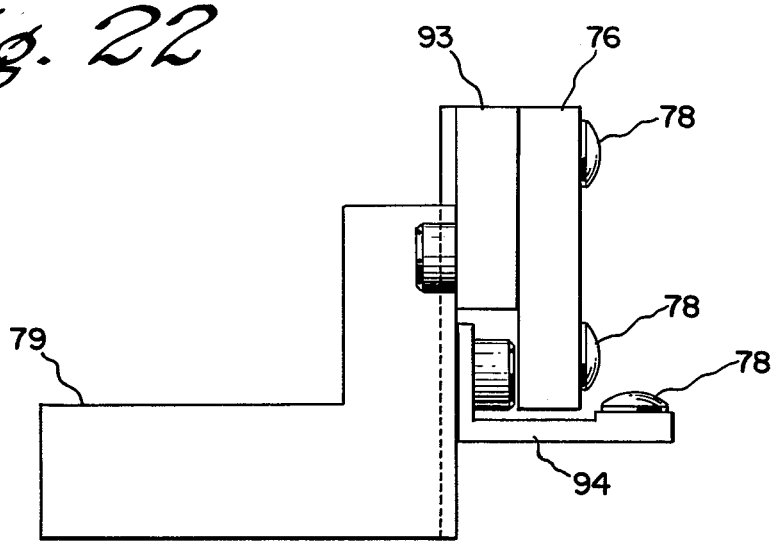
FIGS. 22 and 23 illustrate other configurations of the flat jaw assembly.
Figure 23:
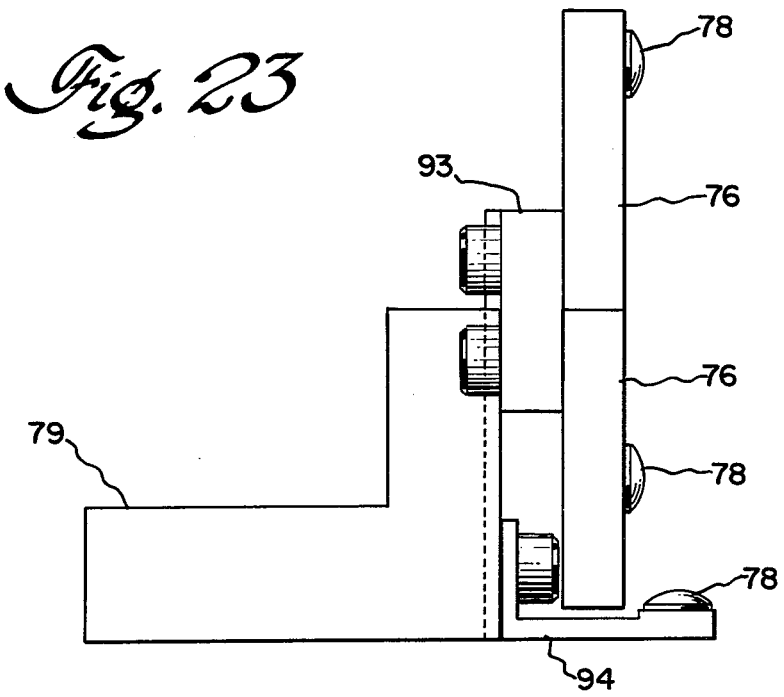

FIG. 20 shows a typical mounting a flat jaw 76 which is shown in FIG. 14. Plate 93 is keyed to fit into the key slot on base 79 and can be mounted in any of the three pairs of holes on base 79 to provide three different heights of plate 93. The three rest button jaw 76 is assembled on plate 93 with any of three pairs of hole to provide still more height possibilities. Jaw 94, which contains several holes for spherical rest buttons similar to jaw 76, also mounts to any of the three pairs of tapped holes in base 79. This pair of flat jaws 76 and 94 are mounted on base 79 so as to form two right angle flat jaws which will accept a rectangular shaped object. An example is shown in FIG. 21. The root of turbine blade 95 is gripped between flat jaws 76 and 94 and a nose jaw 70 like that in FIG. 6. The base, bracket 83, and the jaw are arranged as in FIG. 17. Examples of possible assembled configurations of these two flat jaws 76 and 94 to accommodate various sizes of parts are shown in FIGS. 22 and 23. In the latter, two multiple rest button flat jaws 76 are assembled to the same vertical adjustment bracket 93.

In actual use, a pair of jaw assemblies are assembled and adjusted to suit a particular part type and fastened to the operating mechanism 30 described earlier. Several jaw assembly pairs can be readjusted for different part types. The pairs can then be interchanged quickly by removing the nut on each slide block (such as nut 63 on slide 36), removing the old jaw assembly pair, and the installing the new pair. This enables the apparatus to be quickly changed from one part type to another. Referring to FIG. 3, the gripping device is conveniently loaded manually; the object such as turbine blade 56 is placed by hand between the jaw assemblies 54 and 55 and the pneumatic or hydraulic cylinders 41 and 42 are actuated to cause straight line motion of the jaw assemblies toward one another to engage the object. The vertical position of the turbine blade is not critical because the exact position is sensed optically. This is true for other combinations of the set of generic jaws. For instance, in FIGS. 11a and 11b the position of turbine blade 56 perpendicular to the plane of the paper is sensed.

This gripping device has sufficient precision to handle the part while it is inspected automatically for small surface defects. One such inspection device for turbine blades is described in application Ser. No. 158,372 filed on June 11, 1980, now U.S. Pat. No. 4,349,277 J. L. Mundy, G. B. Porter, and T. M. Cipolla, "Non-contact Measurement of Surface Profile", assigned to the same assignee as this invention.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A gripping device which grasps a wide variety of objects comprising:
   a pair of jaw assemblies each having at least one gripper jaw selected from a set of generic jaws which in different combinations are adapted to grasp objects of many sizes and shapes and inlude nose-shaped jaws primarily for concave and concave/convex surfaces, vee-shaped jaws primarily for convex surfaces, and multiple rest button jaws for flat surfaces;
   an operating mechanism to which said jaw assemblies are removably and interchangeably attached and which has means for providing relative linear motion of said jaw assemblies between open and closed positions in response to actuation of a power source to grip an object in a monostable manner;
   wherein every jaw assembly includes a mounting base and one or more brackets adjustably mounting at least one gripping jaw on said base; and
   said nose-shaped jaws have a radius of curvature in two directions forming a contact area which has the shape of a section of a toroid, said vee-shaped jaws have two contact areas that intersect and are each a sector of a cylinder, and said multiple rest button jaws have a flat mounting plate with an array of holes in which are three spherical rest buttons.

2. The gripping device of claim 1 wherein two of said nose-shaped jaws are mounted back-to-back in one jaw assembly.

3. A gripping device which grasps objects of different sizes and shapes comprising:
   an operating mechanism including a base plate on which parallel rods are supported, a pair of slides on said rods and pneumatic or hydraulic cylinders connected between said base plate and one slide, and a double crank and slider mechanism to move said slides along said rods but in opposite directions;
   interchangeable jaw assemblies removably attached to said slides and each having at least one gripping jaw selected from a set of three basic types of generic jaws which in different combinations are adapted to grasp a wide variety of objects in monostable manner when said operating mechanism is in a closed position;
   every such jaw assembly including a right-angle mounting base and one or more brackets adjustably mounting at least one gripping jaw thereon, and means for precisely locating said jaw assemblies on said slides.

4. The gripping device of claim 3 wherein said generic jaws are nose-shaped jaws primarily for concave and concave/convex surfaces, vee-shaped jaws primarily for convex surfaces, and multiple rest button jaws for flat surfaces.

5. A gripping device for turbine blades comprising:
   an operating mechanism having opposing slides which are mounted on a base plate to have straight line motion;
   a pair of jaw assemblies releasably clamped to said slides and each having at least one gripping jaw selected from a set of nose-shaped, vee-shaped, and multiple rest button jaws which in various combinations grasp the airfoil or root of many different sizes and shapes of turbine blades;
   each jaw assembly having a right-angle mounting base, one or more brackets adjustably mounting said gripping jaw on said base, and pins and holes on said base and slide to precisely locate said jaw assembly on said slide; and
   power means on said operating mechanism for moving said slides and jaw assemblies between an open and a closed position gripping each turbine blade in monostable manner.

6. A gripping device for turbine blades comprising:
   an operating mechanism having opposing slides which are mounted on a base plate to have straight line motion;
   a pair of jaw assemblies releasably clamped to said slides and each having at least one gripping jaw selected from a set of nose-shaped, vee-shaped, and multiple rest button jaws which in various combinations grasp the airfoil or root of many different sizes and shapes of turbine blades;
   power means on said operating mechanism for moving said slides and jaw assemblies between an open and a closed position gripping each turbine blade in monostable manner; and
   a linear motion transducer secured to said base plate and one slide to sense its exact position.

* * * * *